United States Patent [19]

Yoshinaga

[11] 4,086,306
[45] Apr. 25, 1978

[54] CENTRIFUGAL PUMP

[76] Inventor: Kaneyasu Yoshinaga, 166-1, Ohaza Nobe, Tatebayashi City, Gunma Prefecture, Japan

[21] Appl. No.: 769,105

[22] Filed: Feb. 16, 1977

[30] Foreign Application Priority Data

Apr. 9, 1976 Japan .............................. 51-44432[U]

[51] Int. Cl.² ............................................. B01F 3/04
[52] U.S. Cl. .................................... 261/93; 210/219; 210/220; 210/242 A; 239/23; 261/36 R; 261/120; 261/DIG. 75
[58] Field of Search .................. 261/29, 36 R, 87, 91, 261/93, 120, DIG. 75; 210/221 M, 242 A, 219, 220; 239/17, 22, 23, 215, 219, 221, 440, 456

[56] References Cited

U.S. PATENT DOCUMENTS

| | | | |
|---|---|---|---|
| 1,976,956 | 10/1934 | MacLean | 261/93 |
| 1,992,451 | 2/1935 | Thurstensen | 261/93 |
| 2,077,445 | 4/1937 | Wallace et al. | 261/93 |
| 2,116,023 | 5/1938 | Gwidt | 261/87 |
| 2,825,541 | 3/1958 | Moll et al. | 261/29 |
| 3,202,281 | 8/1965 | Weston | 261/93 X |
| 3,620,512 | 11/1971 | Muskat et al. | 261/120 X |
| 3,756,578 | 9/1973 | McGurk | 261/91 |
| 3,846,516 | 11/1974 | Carlson | 261/120 X |

Primary Examiner—Tim R. Miles
Assistant Examiner—Richard L. Chiesa
Attorney, Agent, or Firm—Armstrong, Nikaido, Marmelstein & Kubovcik

[57] ABSTRACT

An oxygenating centrifugal pump is primarily for circulating the aerated water in a culture pond for improving water quality. The centrifugal pump generally comprises a flat-bottomed cuplike vessel having a pair of floaters for floating said pump on a water and a plurality of pipy legs for locking the vessel in a bottom of the pond. An inner hollow cylinder closed at its top end is longitudinally and rigidly mounted through a bottom wall of said vessel, an umbrella-shaped diffuser is secured to a lower periphery of said cylinder and a motor driven shaft having an impeller at its lower end portion is longitudinally mounted in said cylinder to define a diffusing passageway between said diffuser and impeller. A plurality of uniformly spaced water intake slots are provided around a peripheral wall of the upper cylindrical portion, a cover plate having several air-intake ports therethrough is rigidly secured around an upper periphery of the upper cylindrical portion, and an air suction pipe is deeply inserted therein through one of the air-intake ports. In addition, a peripheral water spouting device and a suction pump are provided on the cover plate of the hollow cylinder for blowing out a large quantity of bubbles to eliminate a possible current leakage.

6 Claims, 7 Drawing Figures

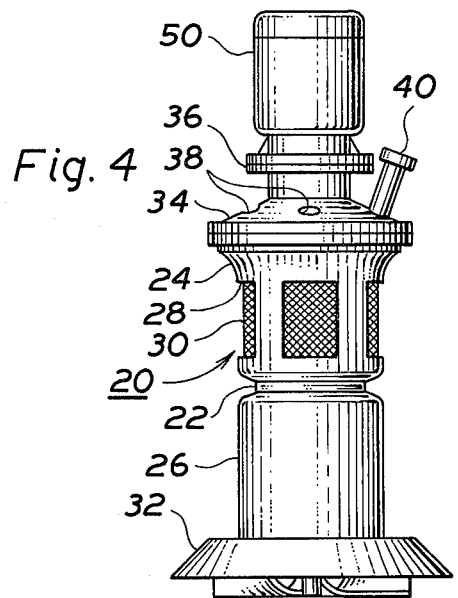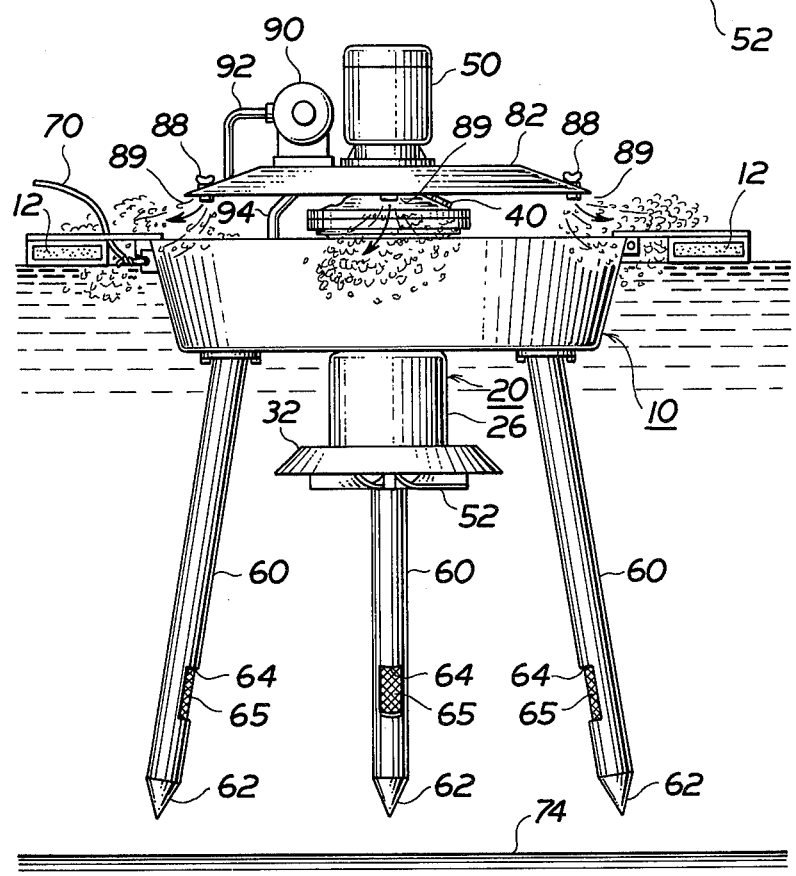

CENTRIFUGAL PUMP

BACKGROUND OF THE INVENTION

1. Field of the Invention

This invention relates to centrifugal pumps of the kind that are used for pumping the oxygenated water to circulate in a culture pond and also for blowing out a large quantity of bubbles which are liable to spread over said centrifugal pumps.

2. Description of the Prior Art

Pumps of this kind have heretofore been constructed with additional floaters and suction pipes extending from the bottom of the pump for absorbing water near the bottom of the pond, resulting in unsteady operation and insufficient improvement of water quality. The centrifugal pump makes a big noise since oxygenation is usually carried out above the water. Another shortcoming of conventional centrifugal pumps is that a large quantity of bubbles are produced through oxygenation to spread over an electric drive motor entirely and also to cause a possible current leakage.

SUMMARY OF THE INVENTION

It is a principal object of this invention to provide a new and improved kind of centrifugal pump for circulating the oxygenated water in a culture pond, a preserve pond, a fish hatchery, a sewerage pond and the like for improving water quality.

Another object of this invention is to provide a centrifugal pump including a pair of floaters provided around its periphery for safely floating said centrifugal pump on the water level in a pond having a large depth.

Still another object of this invention is to provide a centrifugal pump having a plurality of pipy sucking legs for locking said centrifugal pump at a bottom of the pond having a small depth.

Yet another object of this invention is to provide a centrifugal pump for sucking in water short of oxygen and introducing an open air into an inner hollow cylinder, mixing and agitating them in said cylinder, then discharging and circulating said aerated water into the pond as deep and far as possible.

A further object of this invention is to provide a centrifugal pump for stimulating the circulation of the aerated flow of water into a wide range of the pond and also accelerating the solution of oxygen in water to a saturation point.

A still further object of this invention is to provide a centrifugal pump, whereby air and water are agitated and mixed in the inner hollow cylinder substantially below the water level so as not to make a noise.

Another object of this invention is to provide a centrifugal pump for aerating the water not only near the water level, but also near the bottom of a pond and circulating them quickly so as to fully mix them with fresh air.

Another object of this invention is to provide a centrifugal pump for spouting water out of a peripheral water jet slit onto a large quantity of bubbles which are liable to spread over an electric drive motor entirely and for blowing out said bubbles in order to prevent a possible current leakage from the electric drive motor.

Further, the provision of a rope or cable to a periphery of the centrifugal pump contributes to smooth and noiseless operation and serves to a revolving operation of the floating centrifugal pump, thus resulting in the easy, smooth and safe operation.

Other features and advantages of the invention will be apparent from the following description, the accompanying drawings and the appended claims.

BRIEF DESCRIPTION OF THE DRAWING

FIG. 4 is a front elevation of an inner hollow cylinder mounted in the centrifugal pump shown in FIGS. 1 - 3;

FIG. 5 is a front elevation of another embodiment of the centrifugal pump provided with a circumferential water spouting device and floating in water;

DESCRIPTION OF THE PREFERRED EMBODIMENTS

Figure 1:
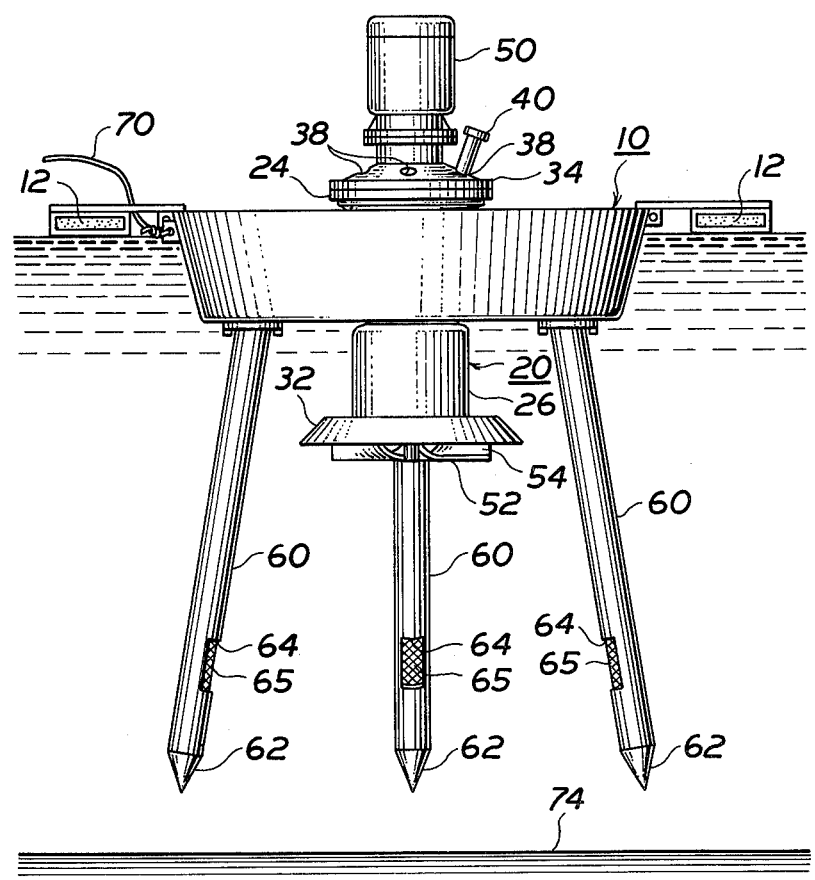
FIG. 1 is a front elevation of a floating oxygenating centrifugal pump in accordance with the invention.

The oxygenating centrifugal pump of this invention comprises a flat-bottomed cup-like vessel 10 which is diametrically provided with a pair of floaters 12 around an upper periphery of said vessel. These floaters 12 serve to float the pump 10 on the water of a pond beyond a depth of said pump.

A large opening 13 is formed through a central portion of a bottom wall 15 of the cup-like vessel 10, and several small openings 17 are uniformly formed adjacent and through a periphery of said bottom wall.

In FIG. 4, a radially extending depression 22 is formed around a medial periphery of an inner hollow cylinder 20 closed at its top end to define an upper cylindrical portion, i.e. a suction chamber 24 and a lower cylindrical portion 26, a plurality of uniformly spaced water intake slots 28 are formed around a peripheral outer wall of the upper cylindrical portion 24, and each slot 28 is provided with a strainer 30 respectively.

The upper cylindrical portion 24 of the inner hollow cylinder 20 is centrally and rigidly mounted in the cup-like vessel 10 having its depression 22 seated through the central opening 13 of the bottom wall 15 so that the lower cylindrical portion 26 may protrude slightly downwardly beyond said bottom wall. Consequently, the upper cylindrical portion 24 of the inner hollow cylinder 20 works as a suction chamber.

An umbrella-shaped diffuser 32 is fastened securely around a lower periphery of the lower cylindrical portion 26. A cover plate 34 having a centrally and vertically projecting flange 36 and also a plurality of air-intake ports 38 through said cover plate is rigidly secured around an upper periphery of the upper cylindrical portion 24 so that the air-intake ports 38 may be always located above the water level. An air suction pipe 40 is biased and deeply inserted into the upper cylindrical portion 24 through one of the air-intake ports 38 to submerge substantially below the water level.

A hub 42 is axially provided within the cover plate 34 and another hub 44 corresponding to said hub is provided axially and near the lower end portion of the lower cylindrical portion 26 by a plurality of radial spokes 46.

A drive shaft 48 is vertically and rotatably supported through these hubs 42 and 44, an upper end portion of said drive shaft is coupled to a motor shaft (not shown) of an electric drive motor 50 by a suitable coupling (not shown), and said drive shaft penetrating downwardly through these hubs 42 and 44 protrudes slightly beyond the lower cylindrical portion 26 to locate within the diffuser 32. Two conductors (not shown) are connected to the motor 50.

A centrifugal impeller 52 is rigidly secured to the lower end portion of the drive shaft 48 to locate adjacent and within the diffuser 32 so that a radial diffusing passageway 54 may be defined between the diffuser 32 and the impeller 52, thus directing the water mixed with fresh air through the passageway 54 into the pond as far and deeply as possible.

A pipy leg 60 having a pointed lower end portion 62 is provided with a water intake port 64 near its lower end portion, said port being mounted with a strainer 65. A top end portion of said pipy leg 60 is rigidly secured to the outer bottom of the cup-like vessel 10 to fit onto each small opening 17 by the conventional means, thus defining a sucker. In securing these legs 60, the lower end portions 62 are slightly and radially widened so that the centrifugal pump may be horizontally stabilized when the legs 60 of the vessel 10 are located at the bottom 74 of the pond having a small depth. Accordingly, a water diffusing passageway 69 is defined from the water intake port 64 into the cup-like vessel 10 through said leg.

Figure 3:
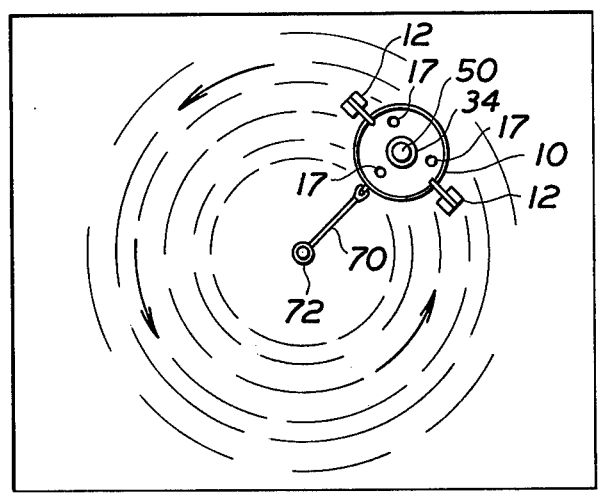
FIG. 3 is a plan view of the centrifugal pump now in use and floatingly revolving around a fixed pole by a cable.

As shown in FIG. 3, the centrifugal pump can be easily moored by a rope or cable 70 to a fixed pole 72 at a center of the pond when the pond has a larger depth than the length of each leg 60.

Figure 6:
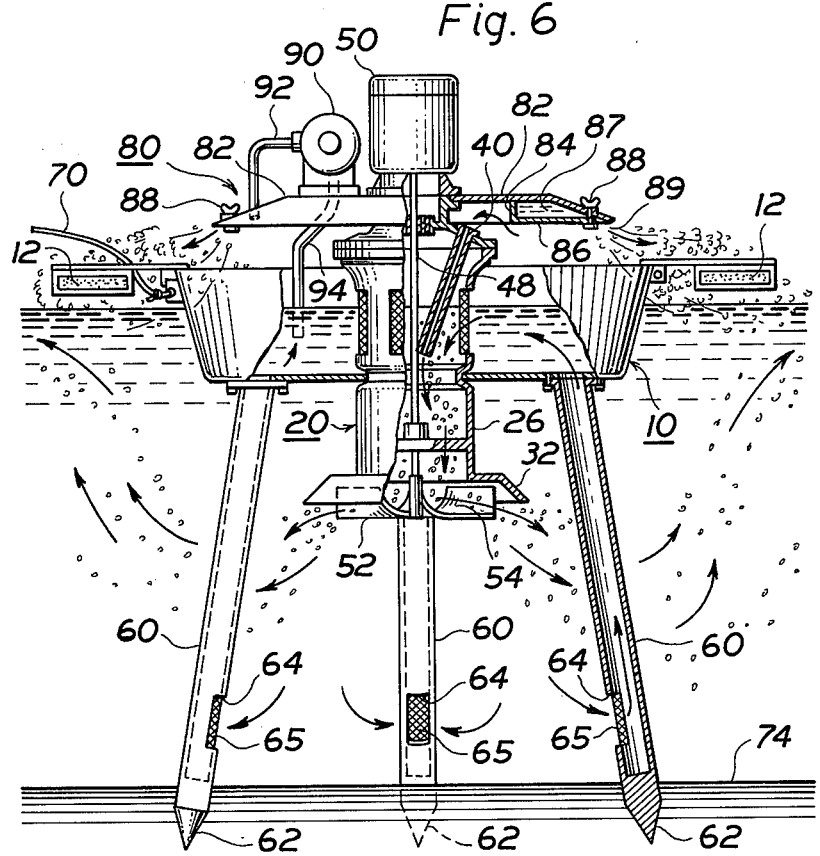
FIG. 6 is a front elevation of the centrifugal pump shown in FIG. 5 and with its pipy legs stabbed into a bottom of a pond and with several portions broken away to show the inside of said pump.
Figure 7:
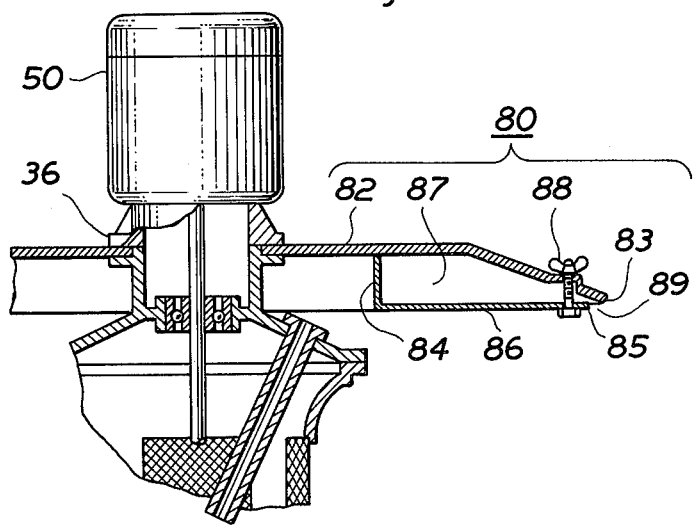
FIG. 7 is an enlarged cross sectional view of a circumferential water spouting device of the embodiments shown in FIGS. 5 and 6.

Referring to FIGS. 5, 6 and 7 showing another embodiment of this invention, an axial flange 36 is longitudinally elongated from the cover plate 34 so that a circumferential water spouting device 80 may be provided around said elongated flange. The water spouting device 80 includes an umbrella-shaped plate 82, a cylindrical wall 84 projecting downwardly from the lower middle portion of said plate, and a radial wall 86 projecting from a lower end periphery of the cylindrical wall 84.

A periphery 85 of the radial wall 86 is in close proximity to a lower surface adjacent a periphery 83 of the umbrella-shaped plate 82 to define an annular space 87 under said plate and also a circumferential slit 89 between each periphery of the umbrella-shaped plate and of the radial wall, and a plurality of uniformly spaced slit adjusters such as bolts 88 are adjustably penetrated adjacent and through each periphery of the plate 82 and the radial wall 86 to adjust the width of said slit.

Consequently, tightening or loosening of the slit adjusters 88 serves to draw or separate the peripheral edge 85 toward or from the lower surface of the umbrella-shaped plate 82 to adjust a width of the peripheral water jet slit 89.

Moreover, a suction pump 90 is mounted on the plate 82, a drain pipe 92 connected to said suction pump projects downwardly into the annular space 87 and a lower end portion of a suction pipe 94 which is connected to said suction pump is submerged into the water within the cup-like vessel 10.

In the embodiment shown in FIGS. 5, 6 and 7, the water sucking through the legs 60, oxygenation into the water in the hollow cylinder 20 and eddy discharging through the passageway 54 between the impeller 52 and the diffuser 32 are carried out similarly to the embodiment shown in FIGS. 1, 2, 3 and 4.

In addition, the water sucked up by the suction pump 90 through the suction 94 is discharged through the drain pipe 92 into the annular space 87 to produce eddy current therein, from which the pressurized water is jetted out of the peripheral water spouting slit 89 around the cup-like vessel 10 to blow out a large quantity of bubbles caused by the operation of the centrifugal pump. Consequently, a danger of current leakage from the electric motor which is likely spread over by the bubbles can be prevented.

Figure 2:
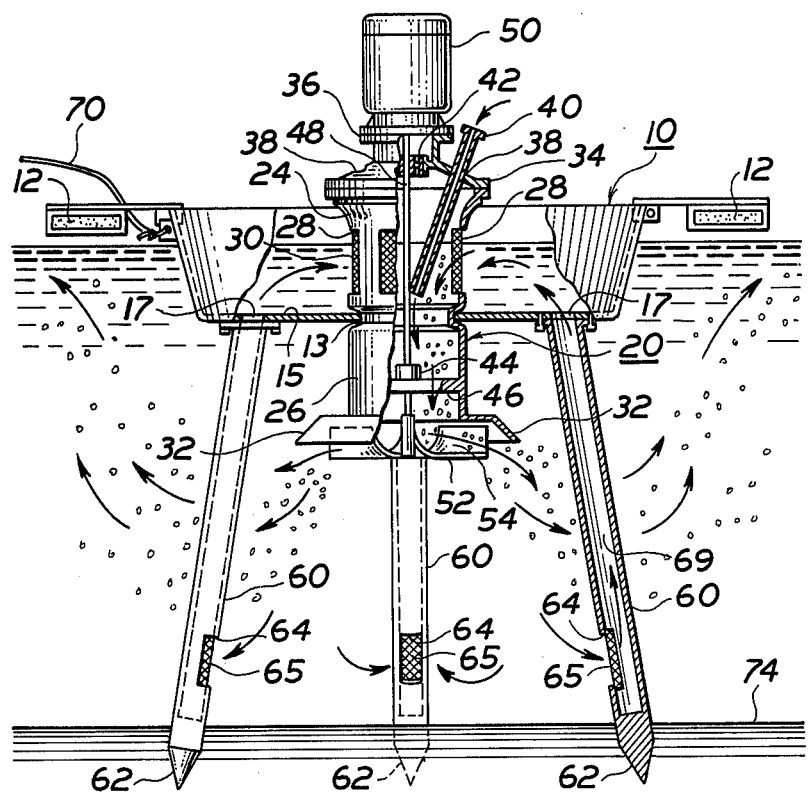
FIG. 2 is a front elevation of the centrifugal pump shown in FIG. 1 with several portions broken away to show the inside of said pump and with its lower end portions of pipy legs being stabbed into a bottom of a pond.

When the culture pond is shallow, the pointed lower end portions 62 of the pipy legs 60 are stabbed into the bottom of said pond to lock the centrifugal pump as shown in FIGS. 2 and 7. In this case, the floaters 12 do not work. The legs 60 being slightly widened at their pointed lower end portions 62, the cup-like vessel 10 can be stabilized horizontally.

In case the water is beyond the legs' depth as shown in FIGS. 1, 3 and 5, the vessel 10 is adapted to float on the water by the floaters 12.

In operation, the motor 50 is driven to rotate the drive shaft 48 and the impeller 52 so that the water near the bottom 74 and short of oxygen is sucked up through the water intake slots 28 and the legs 60 into the cup-like vessel 10 and the inner hollow cylinder 20, and at the same time fresh air is sucked in by a reduced pressure effect from the atmosphere through the air suction pipe 40 into the water within the inner hollow cylinder 20, in which the fresh air is agitated and mixed into the water as shown by an arrow in the drawing and thus the oxygenated water flows axially downwardly into the diffuser 32. Then the oxygenated water is discharged as the eddy current through the water passageway 54 by the impeller 52 and the diffuser 32 into the pond as far and deeply as possible.

As illustrated in FIG. 3, the centrifugal pump revolves around the fixed pole 72 by the rope 70 so that the oxygenation into the water in the pond may be carried out quickly throughout said pond.

As explained in the foregoing paragraphs, the water near the bottom and short of oxygen is sucked up through the sucking legs 60 into the cup-like vessel 10 and the suction chamber 20, in which the fresh air above the water level is sucked into the water and oxygenated well, then discharged by the impeller 52 to diffuse into the water in the pond as far and deeply as possible. As a result, the water not only near the water surface, but also near the bottom 74 are subjected to oxygenation and circulation, and at the same time the oxygenated range can be widened to carry out oxygenation into the water sufficiently so that the time for reaching a saturation point of oxygenation in the water can be virtually saved.

Many modifications within the spirit and scope of the invention of the representative embodiments disclosed herein will occur to those skilled in the art. For example, oxygenating centrifugal pump, other than the one specifically illustrated, may be employed in accordance with the invention. Accordingly, the invention is to be construed as including all of the embodiments thereof within the scope of the appended claims.

What is claimed is:

1. A centrifugal pump adapted to be used in a culture pond comprising;
   a. a flat-bottomed cup-like vessel including a large opening formed through a central portion of the bottom wall thereof and a plurality of smaller holes through a peripheral portion of said bottom wall;
   b. a pair of floaters diametrically positioned around an upper periphery of said vessel;
   c. a leg means downwardly extending from each small hole in the bottom wall, said leg means having a water intake port at the lower end portion thereof, said leg means forming an intake pipe for carrying water from said pond to said vessel and said leg means securing said vessel to said pond;
   d. an inner hollow cylinder closed at its top end and centrally and rigidly mounted through the large central opening of the bottom wall of said vessel and including an upper cylindrical portion having a suction chamber and a lower cylindrical portion separated by a radially extending depression formed around the peripheral wall of said inner hollow cylinder wherein said suction chamber is positioned within said vessel, said lower cylindrical portion extends downwardly below said bottom wall and said depression is seated in said large central opening; and
   e. said inner hollow cylinder further including a plurality of uniformly spaced water intake slots formed around a peripheral wall of the suction chamber, a cover plate rigidly secured around the upper periphery of the upper cylindrical portion, said cover plate having a plurality of air-intake ports therethrough, an air suction pipe inserted into said suction chamber through one of the air-intake ports, the lower portion of said suction pipe being below the water level, a first hub axially provided within said cover plate and a second hub axially mounted on a plurality of radial spokes at the lower end portion of the lower cylindrical portion, an umbrella-shaped diffuser mounted around a lower periphery of the lower cylindrical portion, a drive shaft coupled to a motor shaft of an electric drive motor by a coupling passing through said first and second hubs, said drive shaft protruding beyond the lower cylindrical portion, and a centrifugal impeller rigidly secured to the lower end portion of said drive shaft such that a radial passageway is defined between the diffuser and the impeller.

2. A centrifugal pump of claim 1 wherein an axial flange is longitudinally elongated from the cover plate to provide a circumferential water spouting means, and said water spouting means includes an umbrella-shaped plate, a cylindrical wall projecting downwardly from the lower middle portion of said plate, a radial wall projecting from the lower end periphery of said cylindrical wall toward a lower surface adjacent a periphery of said umbrella-shaped plate in close proximity thereto to define an annular space under said plate and a circumferential slit between each periphery, and a plurality of uniformly spaced bolts adjustably penetrating the peripheral portion of said umbrella-shaped plate to adjust the width of said slit, a suction pump mounted on said umbrella-shaped plate, a drain pipe connected to said suction pump and projecting downwardly into the annular space and a suction pipe connected to said suction pump and submerged into the water within the cup-like vessel.

3. A centrifugal pump of claim 1 wherein the lower end portion of the leg means is at a greater radial distance from the axis of said vessel than the upper end thereof thus forming a wider base for securing the vessel to the pond to stabilize said centrifugal pump at the bottom of the pond.

4. A centrifugal pump of claim 1 wherein the lower end portion of the leg means is pointed such that it easily penetrates into the bottom of the pond to secure said centrifugal pump to the bottom of the pond.

5. A centrifugal pump of claim 1 wherein each said water intake port of the leg means is provided with a strainer.

6. A centrifugal pump of claim 1 wherein each said water intake slot in the suction chamber is provided with a strainer.

* * * * *